July 18, 1939. H. C. FOX Re. 21,152
MARGIN-REGULATING STOP
Original Filed July 1, 1937
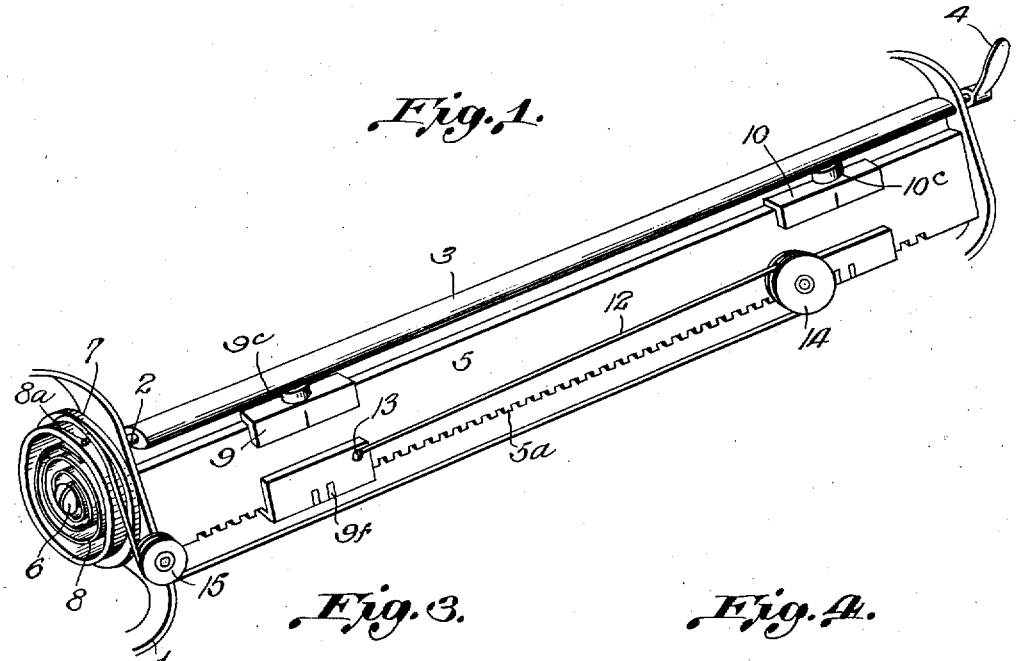
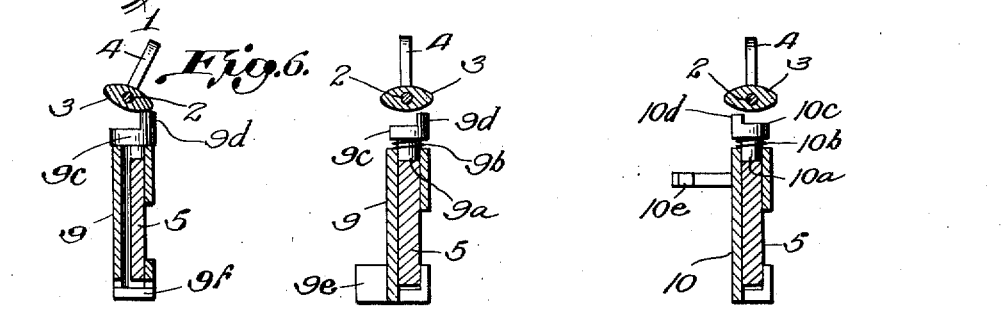
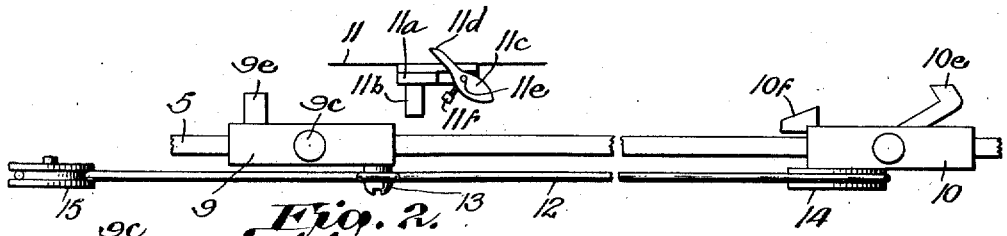
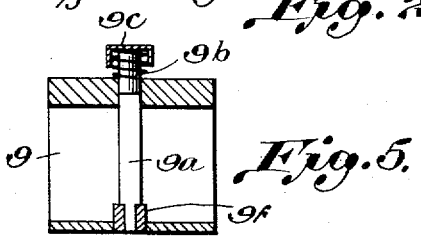
Inventor:
Harold C. Fox
by G. Kennedy, Attorney.

Patented July 18, 1939 Re. 21,152

UNITED STATES PATENT OFFICE 21,152

MARGIN-REGULATING STOP

Harold C. Fox, Waterloo, Iowa

Original No. 2,135,177, dated November 1, 1938, Serial No. 151,384, July 1, 1937. Application for reissue May 2, 1939, Serial No. 271,355

13 Claims. (Cl. 197—63)

My invention relates to improvements in margin-regulating stops for typewriting machines or the like apparatus, and it is an object of my improvements to provide simply constructed inexpensive means therefor adapted for convenient single hand manual actuation of such stops in practice.

Another object of my improvements is to include with the margin regulating means resiliently controlled flexible connecting means for the stops for coaction with manually controlled selective means for releasing severally the stops in relation with a medial fixed abutment for coaction therewith.

Another object of my improvements is to include in the above train of mechanically cooperating devices a single tensioning means for actuating the stops singly as desired when said manually selective means is used appropriately in the unlocking of either from a shiftable dentated carrier bar on which they are slidably mounted, to accomplish the desired adjustment of either stop as stated.

I have accomplished the above objects by the means and mechanisms which are illustrated in the accompanying drawing, described in the specification and claimed in the appended claims.

It is to be understood that various changes may be effected in the different devices of my invention and their relative positions, without thereby departing from my invention and the scope of the claims.

Figure 1 is a perspective frontal view of my invention, as mounted upon spaced side arms of a typewriting machine. Fig. 2 is a top plan of parts of the dentated cross-bar and the pair of stops slidably connected thereto with other and associated elements, other parts being broken away. Figs. 3 and 4 are respectively transverse sections of the cross-bar, the said stops mounted thereon, and the manually operable rock-bar for operating the release mechanism of either stop. Fig. 5 is a medial longitudinal vertical section of the stop shown in Fig. 3, and Fig. 6 is a transverse section of the cross-bar and the stop of Fig. 3, showing the ratchet part of the release stem device disengaged from the teeth of the cross-bar.

Fig. 1 is a perspective view of portions of the shiftable carriage of a typewriting machine, showing my improved marginal stops releasably secured on a transverse dentated bar thereof, and connected for resilient actuation according to my invention, parts of the carriage frame being broken away, or other parts not shown. Fig. 2 is a top plan, with parts broken away, showing the relative associations between the shiftable marginal stops on the dentated bar, relative to a medially positioned relatively fixed abutment and to a flexible operative connection between the stops. Figs. 3 and 4 are respectively medial cross sections of the two marginal stops, and also showing the associated manually operable releasing means therefor.

I have shown in Fig. 1 a portion of the shiftable carriage 1 of a typewriting machine, including vertically disposed end supports connected by a dentated cross-bar 5 whose lower edge has a row of teeth 5*a*. On the bar 5 are slidably mounted a pair of marginal stops 9 and 10 respectively. In Fig. 2 is shown to the rear of the bar 5 a conventional fixed abutment device 11*b* on a backing part 11 of the machine. There are two abutment devices 11*b* and 11*c*, the first relatively fixed, and the other being a rockable stop finger 11*c* having an eccentrically disposed lateral screw 11*f* to be stopped in one direction by the member 11*a*, and in an opposite direction by a finger part 11*d* engageable with the part 11*a*.

Referring to Figs. 3 to 6 inclusive, Figs. 3 and 4 are transverse sections of the cross-bar 5 with the stops 9 and 10 thereof respectively mounted thereon and in detent engagement therewith. The element 5 appears in both, while the elements 9, 9*a*, 9*b*, 9*c*, 9*d*, of Fig. 3, are the same as the similar elements 10, 10*a*, 10*b*, 10*c*, and 10*d* of Fig. 4. In Fig. 2 are shown the rearward projections 9*e* of the stop 9, and the rearward projections 10*e* and 10*f* of the stop 10. Figs. 5 and 6 further illustrate the features of the stop 9, Fig. 5 showing the detent 9*f* in its position separated from the cross-bar 5 but as in a position of the detent as when engaged therewith, while in Fig. 6 the rock-bar 2 is shown as operatively engaged with the cap projection 9*d*, and as having pushed down the detents 9*f* releasing the stop from the cross-bar 5 to permit sliding of the stop on the cross-bar. In Fig. 6 the cap 9*c* is depressed by the rock-bar 2 engaging and pushing downwardly on the stud 9*d*. The cap is integral with a depending stem 9*a* cylindrical at the top and excised lengthwise below with a flat forward face and having at its lower end a forwardly projecting pair of detents 9*f* adapted to engage in fitting notches of the stop 9. A coiled spring 9*b* is seated within the cap 9*c* around the cylindric part of the stem 9*a*, and is engaged with the top of the stop 9, and when compressed as in Fig. 6 and then released, the spring reacts to return the stem 9*a* to reengage the detents with teeth of the cross-bar 5.

Fig. 4 is a section of the other stop 10, and the above description of the stop 9 and its parts applies also to the like parts of the stop 10, viz: as shown at 10*a*, 10*b*, 10*c*, and 10*d*, excepting the use on the stop 10 of a rearwardly obliquely projecting member 10*e*, which may be stopped by the rockable abutment member 11*c*. The stop 10 also has a rearwardly projecting beveled member 10*f* used as a bell ringer, as in common practice.

The marginal stops illustrated in Figs. 3, 4, 5 and 6 are shown and described in Gabrielson Patent No. 1,933,550, dated November 7, 1933, except for the off-set studs 9*d* and 10*d* which were added for cooperation with the oppositely rockable rod 3.

A sheave 15 is rotatably mounted upon the left-hand side standard of the frame 1. Another sheave 14 is rotatably mounted upon the left-hand part of the forward face of the stop 10. A spring drum 7 is rotatably mounted upon a headed screw 6 which is threaded into said left-hand standard. The drum 7 contains a spiral spring 8 whose inner end is secured to the shank of the screw 6, while its outer end is fastened by a rivet 8*a* to the inner circumferential wall of the drum. A flexible non-extensible cord or cable 12 has one termination secured by a screw 13 to the forward wall of the stop 9 below its division, and is carried to the right-hand to and around the grooved edge of the sheave 14 reversely to the left-hand, thence around the grooved sheave 15 upwardly and to wind upon the circumferential periphery of the drum 7 to which it is end-attached. The spring 8 may be placed under tension by turning the screw axis appropriately, thus placing the cable 12 under lengthwise tension.

A rockable rod 3, a widened or elliptical cross section, has end pintles 2 rockably seated through the side standards of the frame 1, the right-hand pintle having a short crank-handle 4 for manual use. The rod 3 is immediately above the upper edge of the dentated bar 5 in spaced relation and parallel therewith, but normally as shown clearing the offset projections 9*d* and 10*d* of the vertically movable heads 9*c* and 10*c* on the stops 9 and 10. In this position of the rod 3, as shown in Figs. 3 and 4, the heads 9*c* and 10*c* of said stops are cleared, and the springs 9*b* and 10*b* which press upon the caps 9*c* and 10*c*, respectively retain the detents of stops 9 and 10 in upper positions with the stop detents 9*f* engaged with the bar teeth 5*a*.

When by means of the crank handle 4 the rod 3 is rocked forwardly downwardly, (see Fig. 3), its near edge part presses down the projection 9*d* and cap 9*c*, compressing the spring 9*b*, and by this spring pushing down the detents 9*f*, thus releasing the lower cross part of this stop from the teeth of the bar 5.

The released stop 9 may then be slid along the bar 5 to a desired marginal position, and the crank 4 being released, the spring 9*b* reacts as the rod 3 is rocked to its medial position, the head 9*c* returning with the stop frame 9 to re-lock it to the bar 5. The spring 8 in the barrel 7 acts in tensioning the cord 12 and stop 9 to move the stop to the right. The stop may be returned slidably when the crank is rocked forwardly. The other stop 10 is controlled in the same manner by rocking the rod 3 rearwardly instead of forwardly, acting to depress the oppositely offset projection 10*d* of the cap 10*c*.

It will be noticed that the use of the cord or cable 12 as carried from the stop 9 to and around the sheave 14 on the stop 10, and thence reversely to be wound upon the spring barrel, is kept taut, the cord being inextensible, although if a slight extension thereof occurs after much use, the screw axis 6 of the drum 7 may be adjusted to take up any slackness. The device thus may be manipulated by one hand, which in practice is more convenient for the operator and a saver of time, as compared with a stop device which includes spring drums at both ends of the shiftable frame bar 5.

My device is of relatively simple and inexpensive construction, and with little or no adjustments, may be mounted operatively upon the dentated bar 5 of any make of typewriting machine or the like.

What I claim is:

1. In a typewriting or like machine, a margin regulating means comprising in combination, a longitudinally shiftable dentated bar, abutments mounted in the machine frame adjacent said bar, releasable marginal stops mounted slidably on the bar for occasional engagements with said abutments, each stop including a resiliently controlled detent releasably engaged with teeth of said bar, tension producing means, a cable end-connected to said tension producing means and carried thence around a part of the stop most remote from the tension producing means and reversely returned and end-connected to the stop nearest to the tension producing means, and a single reversely rockable operating means for manual manipulation to engage releasably either detent in dis-engaging it from teeth of said bar to permit sliding of the released stop to and fro along the bar separately and adjustably.

2. In a typewriting or like machine, a margin regulating means comprising in combination, a longitudinally shiftable dentated bar, abutments mounted in the machine frame adjacent said bar, releasable marginal stops mounted slidably on the bar for occasional engagements with said abutments, each stop including a resiliently controlled detent releasably engaged with teeth of said bar, a spring drum mounted adjacent one end of said bar, a cable end-connected to and windable on the spring drum, carried thence around a part of the stop most remote from the said drum and returned reversely with its other end connected to the stop nearest the drum, and a reversely rockable and transversely widened rod positioned along said bar and mounted to shift longitudinally with said bar and for manual rocking of said rod in either of two opposite directions to releasably engage and actuate either detent separately to disengage it from the bar teeth to permit the released stop to be slidably adjusted therealong in a to and fro direction relative to the adjustments of the other stop.

3. In a typewriting or like machine, a margin regulating means comprising a dentated bar, stop means adjacent thereto, means supporting the bar and stop means for relative reciprocating movement therebetween lengthwise of the bar, a pair of margin stops slidable along said bar and mounted on the said bar at opposite sides of said stop means, each margin stop including a detent releasably engagable with teeth of said bar to hold the stop against sliding movement along the bar, said slidable stops being arranged to cooperate with said stop means to limit the extent of the relative reciprocating movement between the bar and stop means, resilient means carried by each of said slidable margin stops to normally retain the stop detent in engagement with teeth of said bar, a single detent-releasing device oppositely rockable about an axis extending parallel to the longitudinal axis of the bar and arranged to release the detent of one of said slidable stops when rocked in one direction and to release the detent of the other slidable stop when rocked in the opposite direction, and resiliently controlled single tension means connected to both slidable stops to tensionally pull along the dentated bar toward the said stop means that one of the slidable margin stops whose detent is released by said releasing device, said releasing device being effective on the stops in all positions of the stops 4. In a typewriting or like machine, a margin regulating means comprising a dentated bar, stop means adjacent thereto, said bar and stop means being mounted for relative reciprocating movement therebetween in the direction of length of the bar, a pair of marginal stops mounted on said bar at opposite sides of said stop means for sliding adjustment along the bar, each marginal stop including a detent releasably engageable with teeth of said bar to hold the stop in adjusted position, said marginal stops cooperating with the said stop means to limit the extent of relative reciprocating movement between the bar and stop means, resilient means carried by each marginal stop to normally retain the stop detent in engagement with teeth of said bar, a single device oppositely rockable about an axis extending parallel to the longitudinal axis of the bar to release the detent of one of said marginal stops when rocked in one direction and to release the detent of the other marginal stop when rocked in the opposite direction, and resiliently controlled single means connected to both marginal stops to move the released one of said marginal stops along the said dentated bar toward said stop means upon a stop detent releasing actuation of said device in either direction from an intermediate idle position of said device, said device being mounted to extend along said bar at all times throughout the maximum range of adjustment of both marginal stops and being effective, when held in either stop releasing position to maintain the released condition of the released stop during relative travel between the released stop and the bar.

5. In a typewriting or like machine, a margin regulating means comprising a dentated bar, stop means adjacent thereto, said bar mounted for reciprocating travel endwise of the bar and relatively to said stop means, a pair of marginal stops slidably mounted on and adjustable along the said bar at opposite sides of said stop means and each including a detent releasably engaging teeth of said bar to hold the stop in adjusted position, said marginal stops cooperating with the said stop means, resilient means carried by each of said slidably adjustable marginal stops to normally retain the stop detent in engagement with teeth of said bar, a single device extending along said bar and mounted to travel with said bar and for manual rocking thereof in opposite directions from an idle position about an axis extending parallel to the longitudinal axis of the bar, said device being operable to release the detent of one marginal stop when rocked in one direction from idle position and to release the detent of the other marginal stop when rocked in the opposite direction from idle position, and resiliently controlled single means connected to both marginal stops to move either of said stops, upon release of its detent from the bar teeth, along the said dentated bar toward said stop means, said rockable device when rocked to either of its detent releasing positions holding the released detent in released position during movement of the marginal stop along the bar.

6. In a typewriting or like machine, a margin regulating means comprising a dentated bar, stop means adjacent thereto, said bar and stop means being mounted for relative reciprocating motion therebetween longitudinally of the bar, a pair of marginal stops mounted on and slidably adjustable along said bar at opposite sides of said stop means, each marginal stop including a detent releasably engaging teeth of said bar, said marginal stops cooperating with the said stop means to limit the extent of said reciprocating motion between the bar and stop means, resilient means carried by each marginal stop to normally retain the stop detent in engagement with teeth of said bar, a spring drum mounted adjacent one end of said bar to rotate about an axis fixedly related to the bar, a sheave carried by the marginal stop most remote from the drum, a second sheave mounted adjacent the drum to rotate about an axis fixedly related to the bar, a cable end-connected to and windable on said drum, the said cable being reeved around the sheave on the margin stop most remote from the drum and connected at its other end to the margin stop nearest the drum, and means manually operable to release one stop detent at a time from the teeth of said bar and hold the released detent released during travel of the stop having said detent to thereby free said stop and permit the spring drum and cable to move the said marginal stop toward the said stop means.

7. In a typewriting or like machine, a margin regulating means comprising a carriage, a dentated bar mounted on and movable with the carriage, stop means on the machine frame adjacent said bar, a pair of marginal stops mounted on and slidably adjustable along said bar at opposite sides of said stop means, each marginal stop including a detent releasably engaging teeth of said bar, said marginal stops cooperating with the said stop means to limit the extent of the reciprocating motion of the carriage and bar, resilient means carried by each marginal stop to normally retain the stop detent in engagement with teeth of said bar, a spring drum mounted adjacent one end of said bar to rotate about an axis fixedly related to the bar, a sheave carried by the marginal stop most remote from the drum, a second sheave mounted adjacent the drum to rotate about an axis fixedly related to the bar, a cable end-connected to and windable on said drum, the said cable being reeved around the sheave on the margin stop most remote from the drum and connected at its other end to the margin stop nearest the drum, and means manually operable to release one stop detent at a time from the teeth of said bar and hold the released detent released during travel of the stop including said detent to thereby free the said slidable marginal stop and permit the spring drum and cable to move the said marginal stop toward the stop means.

8. In a typewriting or like machine, a margin regulating means comprising a dentated margin stop bar, stop means adjacent thereto, said bar and stop means being mounted for relative reciprocating travel therebetween longitudinally of the bar, a pair of margin stops mounted on and slidably adjustable along said bar at opposite sides of said stop means, each stop including a detent releasably engageable with teeth of said bar to hold the stop in adjusted position and resiliently controlled to normally assume tooth engaging position, resiliently controlled means connected to both margin stops to drive them toward each other, and a single releasing device for said pair of margin stops oppositely rockable manually from an idle position and about an axis extending parallel to the longitudinal axis of the bar, said device being mounted to extend along the bar at all times for stop releasing operation on the stops in all adjustable positions of the stops, and each stop including a part engageable and shiftable by said device to release the stop detent when the latter is rocked from idle position, said two stop parts being offset transversely of the axis of said releasing device for shifting of different ones of said parts by the device when the device is rocked in different directions from idle position.

9. In a typewriting or like machine, a margin regulating means comprising in combination, a carriage, a dentated bar mounted on and shiftable with the carriage, abutments mounted in the machine frame adjacent said bar, marginal stops mounted slidably on said bar for occasional separate and independent engagements with said abutments, each marginal stop including a resiliently controlled detent releasably engaged with the teeth of the bar, a spring drum mounted on the carriage adjacent one end of said bar, a cable end-connected to and windable on said drum, a sheave mounted on the margin stop most remote from said drum, the cable being reeved around the sheave on the margin stop most remote from the drum and connected at its other end to the margin stop nearest the drum, and oppositely rockable means on the carriage for manually disengaging either stop detent from the bar.

10. In a typewriting or like machine, a margin regulating means comprising a dentated bar, stop means adjacent thereto, means supporting the bar and stop means for relative reciprocating movement therebetween lengthwise of the bar, a pair of margin stops slidable along said bar and mounted on the said bar at opposite sides of said stop means, each margin stop including a detent releasably engageable with teeth of said bar to hold the stop against sliding movement along the bar, said slidable stops being arranged to cooperate with said stop means to limit the extent of the relative reciprocating movement between the bar and stop means, resilient means carried by each of said slidable margin stops to normally retain the stop detent in engagement with teeth of said bar, a single detent-releasing device oppositely rockable about an axis extending parallel to the longitudinal axis of the bar and arranged to release the detent of one of said slidable stops when rocked in one direction and to release the detent of the other slidable stop when rocked in the opposite direction.

11. In a typewriting or like machine, a margin regulating means comprising a dentated bar, stop means adjacent thereto, means supporting the bar and stop means for relative reciprocating movement therebetween lengthwise of the bar, a pair of margin stops slidable along said bar and mounted on the said bar at opposite sides of said stop means, each margin stop including a detent releasably engageable with teeth of said bar to hold the stop against sliding movement along the bar, said slidable stops being arranged to cooperate with said stop means to limit the extent of the relative reciprocating movement between the bar and stop means, resilient means carried by each of said slidable margin stops to normally retain the stop detent in engagement with teeth of said bar, a single detent-releasing device oppositely rockable about an axis extending parallel to the longitudinal axis of the bar and arranged to release the detent of one of said slidable stops when rocked in one direction and to release the detent of the other slidable stop when rocked in the opposite direction said releasing device being effective on the stops in all positions of the stops, and automatically operating means to move along the dentated bar toward the said stop means that one of the slidable margin stops whose detent is released by said releasing device, said releasing device when held in either stop releasing position maintaining the released condition of the released stop during the relative travel between the released stop and the bar.

12. In a typewriting machine or the like, a margin regulating means comprising a dentated margin bar, stop means adjacent thereto, said bar and stop means being mounted for relative reciprocating travel therebetween longitudinally of the bar, a pair of margin stops mounted on and slidably adjustable along said bar at opposite sides of said stop means each marginal stop including a detent releasably engageable with the teeth of said bar, said marginal stops cooperating with said stop means to limit the extent of the relative reciprocating travel between the bar and the stop means, resilient means carried by each marginal stop to normally retain the stop detent in engagement with the teeth of said bar, a spring drum adjacent one end of said bar, a sheave carried by the marginal stop most remote from the drum, a cable end-connected to and windable on said drum, said cable being reeved around the sheave on the margin stop most remote from the drum and connected at its other end to the margin stop nearest the drum, and means manually operable to release one detent at a time from the teeth of the bar and to hold the released detent released during the travel of the stop including said detent to thereby free said slidable margin stop to permit the spring drum and cable to move said marginal stop toward the stop means.

13. In a typewriting or like machine, a margin regulating means comprising a carriage, a dentated bar mounted on and movable with the carriage, stop means on the machine frame adjacent said bar, a pair of margin stops mounted on and slidably adjustable along said bar at opposite sides of said stop means, each margin stop including a detent releasably engageable with the teeth of said bar to hold the stop against sliding movement along the bar, said slidable stops being arranged to cooperate with the stop means to limit the extent of the reciprocating motion of the carriage and bar, resilient means carried by each margin stop to normally retain the stop detent in engagement with the teeth of said bar, a single detent releasing device oppositely rockable about an axis extending parallel to the longitudinal axis of the bar and arranged to release the detent of one of said slidable stops when rocked in one direction and to release the detent of the other slidable stop when rocked in the opposite direction, said releasing device being effective on the stops in all positions of the stops, and automatically operating means to move along the dentated bar toward the said stop means that one of the slidable margin stops whose detent is released by said releasing device, said releasing device when held in releasing position maintaining the released condition of the released stop during the relative travel between the released stop and the bar.

HAROLD C. FOX.